(12) United States Patent
Nagahama et al.

(10) Patent No.: US 8,476,577 B2
(45) Date of Patent: Jul. 2, 2013

(54) OPTICAL ENCODER

(75) Inventors: Tatsuya Nagahama, Kawasaki (JP); Miyako Mizutani, Kawasaki (JP); Toru Yaku, Kawasaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 390 days.

(21) Appl. No.: 12/955,744

(22) Filed: Nov. 29, 2010

(65) Prior Publication Data

US 2011/0233390 A1 Sep. 29, 2011

(30) Foreign Application Priority Data

Mar. 29, 2010 (JP) ................................. 2010-074847

(51) Int. Cl.
*G01D 5/34* (2006.01)
(52) U.S. Cl.
USPC .............. 250/231.13; 250/231.18; 250/237 G
(58) Field of Classification Search
USPC ............................. 250/231.13–231.18, 237 G
See application file for complete search history.

(56) References Cited

U.S. PATENT DOCUMENTS

| | | | |
|---|---|---|---|
| 6,273,336 B1 | 8/2001 | Rudeen et al. | |
| 6,457,645 B1 | 10/2002 | Gardner, Jr. | |
| 6,940,891 B2 | 9/2005 | Clary et al. | |
| 7,019,842 B2 * | 3/2006 | Holzapfel et al. | 356/499 |
| 7,071,461 B2 | 7/2006 | Iguchi et al. | |
| 7,795,576 B2 | 9/2010 | Chin et al. | |
| 2003/0209658 A1 | 11/2003 | Iguchi et al. | |

FOREIGN PATENT DOCUMENTS

| | | |
|---|---|---|
| JP | 2003307440 A | 10/2003 |
| JP | 2006284564 A | 10/2006 |

* cited by examiner

*Primary Examiner* — Tony Ko
(74) *Attorney, Agent, or Firm* — Seed IP Law Group PLLC (57) ABSTRACT

A miniaturized optical encoder capable of obtaining a sufficient amount of light in the light receiving element is provided. An optical encoder 1 includes a scale 2 having scale markings 21 and a readhead 3 having a light source 31 that emits light to the scale 2, a scale-side lens 32 that transmits the light emitted from the light source 31 to the scale 2, and a light receiving element 33 that receives the light that has been reflected by the scale 2 and that has passed through the scale-side lens 32. The light source 31 is arranged between the scale-side lens 32 and the light receiving element 33, and a distance between the light source 31 and the scale-side lens 32 is set to be a focal distance fs of the scale-side lens 32. An optical axis Lsrc of the light source 31 is matched with an optical axis Ls of the scale-side lens 32 in a reading direction of the scale markings 21 and is separated from an optical axis Ls of the scale-side lens 32 by a predetermined distance D in a direction perpendicular to the reading direction of the scale markings 21.

15 Claims, 10 Drawing Sheets

OPTICAL ENCODER

BACKGROUND

1. Technical Field

The present invention relates to an optical encoder.

2. Description of the Related Art

In the related art, there is known an optical encoder including a scale having latticed or striped scale markings and a readhead, which has a light source that emits light to the scale and a light receiving element that receives the light reflected by the scale, so that the position of the readhead with respect to the scale is measured based on the light received by the light receiving element. Some sample optical encoders are disclosed in Japanese Patent Application Publication Nos. 2003-307440 ("Patent Document 1") and 2006-284564 ("Patent Document 2").

The optical encoder disclosed in Patent Document 1 includes scale markings (a scale) and a reflection type optical reader (a readhead) having a light-emitting diode (a light source), an object lens, and a light receiving unit (a light receiving element). In addition, the reflection type optical reader has a half-mirror arranged between the light-emitting diode and the object lens so that an optical path of the light emitted from the light-emitting diode and directed toward the scale markings through the object lens is separated from an optical path of the light reflected by the scale markings and directed toward the light receiving unit through the object lens.

However, in the optical encoder disclosed in Patent Document 1, as the light receiving unit receives the light through the half-mirror, there may be a problem that a sufficient amount of light cannot be obtained. In addition, if the amount of the light emitted from the light-emitting diode increases in order to obtain a sufficient amount of light, power consumption of the light-emitting diode increases, and further, lifetime of the light-emitting diode decreases.

On the other hand, the photoelectric encoder (optical encoder) disclosed in Patent Document 2 includes a scale, a light source, a lens, and a light receiving element. In the photoelectric encoder, an optical path of the light emitted from the light source and directed toward the scale is separated from an optical path of the light reflected by the scale and directed toward the light receiving element through the lens, and a sufficient amount of light is obtained by the light receiving element by arranging the scale, the lens, and the light receiving element in a Scheimpflug relationship.

BRIEF SUMMARY

However, in the photoelectric encoder disclosed in Patent Document 2, the scale and the light receiving element cannot be arranged in parallel. Therefore, there is a problem in that the photoelectric encoder becomes large in size.

In addition, in the photoelectric encoder disclosed in the fifth embodiment of Patent Document 2, the scale and the light receiving element are arranged in parallel by arranging four lenses between the scale and the light receiving element. However, in this photoelectric encoder, since four lenses are arranged between the scale and the light receiving element, there is a problem in that the photoelectric encoder becomes large in size.

The present invention provides a miniaturized optical encoder capable of obtaining a sufficient amount of light in the light receiving element.

An optical encoder according to the present invention includes a scale having latticed or striped scale markings, and a readhead, which has a light source that emits light to the scale. The readhead includes a light receiving element that is arranged in parallel with the scale and receives the light reflected by the scale, so that the position of the readhead with respect to the scale is measured based on the light received by the light receiving element, wherein the readhead has a scale-side lens that transmits the light emitted from the light source to the scale and transmits the light reflected by the scale to the light receiving element. The light source is arranged between the scale-side lens and the light receiving element, and a distance between the light source and the scale-side lens is set to be a focal distance of the scale-side lens, and wherein an optical axis of the light source is matched with an optical axis of the scale-side lens in a reading direction of the scale markings and is separated from an optical axis of the scale-side lens by a predetermined distance in a direction perpendicular to a reading direction of the scale markings.

In this configuration, since the optical axis of the light source is separated from the optical axis of the scale-side lens by a predetermined distance in the direction perpendicular to a reading direction of the scale markings (hereinafter, referred to as a direction perpendicular to the scale markings), the illumination light emitted from the light source is transmitted to the scale through a light source-side of the scale-side lens in a direction perpendicular to the scale markings. In addition, this light is reflected by the scale and received by the light receiving element through a side of the scale-side lens opposite to the light source-side in a direction perpendicular to the scale markings Therefore, according to the present invention, it is possible to separate the optical path of the light emitted from the light source and directed toward the scale from the optical path of the light reflected by the scale and directed toward the light receiving element through the scale-side lens without using a half-mirror. Therefore, it is possible to obtain a sufficient amount of light in the light receiving element.

In addition, the scale and the light receiving element are arranged in parallel, and a single scale-side lens is arranged between the scale and the light receiving element. Since the light source is arranged between the scale-side lens and the light receiving element, it is possible to miniaturize the optical encoder.

Furthermore, since a distance between the light source and the scale-side lens is set to be the focal distance of the scale-side lens, the optical encoder can be used to constitute an object (scale) side telecentric optical system in a reading direction of the scale markings, to thereby increase the focal depth of the readhead. Accordingly, it is possible to increase an allowable interval between the scale and the readhead.

According to the present invention, it is preferable that the predetermined distance is set to be equal to or larger than ½ of a width of the light source in a direction perpendicular to a reading direction of the scale markings.

Here, if the predetermined distance between the optical axis of the light source and the optical axis of the scale-side lens in a direction perpendicular to the scale markings is set to be smaller than ½ of the width of the light source in a direction perpendicular to the scale markings, a part of the light source protrudes from the optical axis of the scale-side lens in a direction perpendicular to the scale markings so that the light receiving element does not receive light. Therefore, use efficiency of the light emitted from the light source is degraded.

On the other hand, according to the present invention, since the predetermined distance between the optical axis of the light source and the optical axis of the scale-side lens in a direction perpendicular to the scale markings is set to be equal to or larger than ½ of the width (numerical aperture) of the light source in a direction perpendicular to the scale markings, it is possible to improve use efficiency of the light emitted from the light source.

According to the present invention, it is preferable that the readhead has an aperture for transmitting the light that has been reflected by the scale and has passed through the scale-side lens toward the light receiving element, that a distance between the aperture and the scale-side lens is set to be a focal distance of the scale-side lens, and that within a plane perpendicular to a reading direction of the scale markings, an optical axis of the aperture and an optical axis of the light source are axisymmetrical to each other with respect to an optical axis of the scale-side lens.

Here, if the optical encoder according to the present invention is configured in reliance solely on the width or the position of the light source, there is a problem that performance of the optical system of the optical encoder may vary due to influence from positional deviation of the light source.

According to the present invention, since the optical encoder has an aperture for transmitting the light that has been reflected by the scale and passed through the scale-side lens, it is possible to achieve an object (scale) side telecentric optical system by designing the width or position of the aperture, in addition to by designing the width or position of the light source. Since designing or positioning the aperture is relatively easier than designing or positioning the light source, it becomes easier to suppress variance in the performance of the optical system of the optical encoder.

According to the present invention, it is preferable that the readhead has a light receiving element-side lens arranged between the aperture and the light receiving element, a distance between the aperture and the light receiving element-side lens is set to be a focal distance of the light receiving element-side lens, and an optical axis of the light receiving element-side lens is matched with an optical axis of the scale-side lens.

In this configuration, since the optical encoder can be used to constitute a bidirectional telecentric optical system in a reading direction of the scale markings, it is possible to increase the focal depth. Accordingly, it is also possible to increase the allowable interval between the light receiving element and the light receiving element-side lens.

According to the present invention, it is preferable that the readhead has a light receiving element-side lens arranged between the aperture and the light receiving element, a distance between the aperture and the light receiving element-side lens is set to be the focal distance of the light receiving element-side lens, and an optical axis of the light receiving element-side lens is matched with an optical axis of the scale-side lens in a reading direction of the scale markings and is separated from an optical axis of the scale-side lens by twice the predetermined distance in a direction perpendicular to a reading direction of the scale markings.

In this configuration, the optical encoder can be used to constitute a bidirectional telecentric optical system in a reading direction of the scale markings. Accordingly, it is also possible to increase the allowable interval between the light receiving element and the light receiving element-side lens.

In addition, since both of the optical axes of the scale-side lens and the light receiving element-side lens are separated by a predetermined distance, respectively, on both sides from the optical axis of the aperture along the direction perpendicular to the reading direction of the scale markings, the light passing through the aperture transmits through the portions of the lenses having the same shape. As a result, the optical encoder can be used to reduce influence of the lens aberration and perform accurate measurement.

According to the present invention, it is preferable that the readhead has two light sources, two scale-side lenses, and two apertures, and within the YZ plane perpendicular to the X reading direction of the scale markings, the optical axes of each light source, each scale-side lens, and each aperture are axisymmetrical to one another with respect to the Z optical axis of the light receiving element-side lens.

In this configuration, the light beams reflected by two scale markings can be received by a single light receiving element. Therefore, for example, the optical encoder can be configured such that one set of scale markings is used for detecting a movement amount of the scale and the readhead and another set of scale markings is used for detecting the origins of the scale and the readhead, and light from both of these two sets of scale markings can be received by the single light receiving element. As a result, it is possible to reduce the number of components in comparison with the case where the optical encoder is configured to receive the light beams with two light receiving elements.

According to the present invention, it is preferable that the light source includes a light-emitting body that emits light and a diffusion plate that is arranged in a later stage of an optical path of the light emitted from the light-emitting body and diffuses the light emitted from the light-emitting body.

In this configuration, since the width of the light source can be substituted with the width of the diffusion plate, it is possible to more easily design the optical encoder.

According to the present invention, it is preferable that the light source includes a light-emitting body that emits light and a light-emitting body lens arranged in a later stage of an optical path of the light emitted from the light-emitting body, and the scale-side lens and the light-emitting body lens constitute a Kohler illumination.

In this configuration, since it is possible to reduce unevenness of the light emitted from the light source and directed toward the scale through the scale-side lens, it is possible to perform accurate measurement.

DETAILED DESCRIPTION OF THE INVENTION

First Embodiment

Hereinafter, a first embodiment of the present invention will be described with reference to the accompanying drawings.

Figure 1:
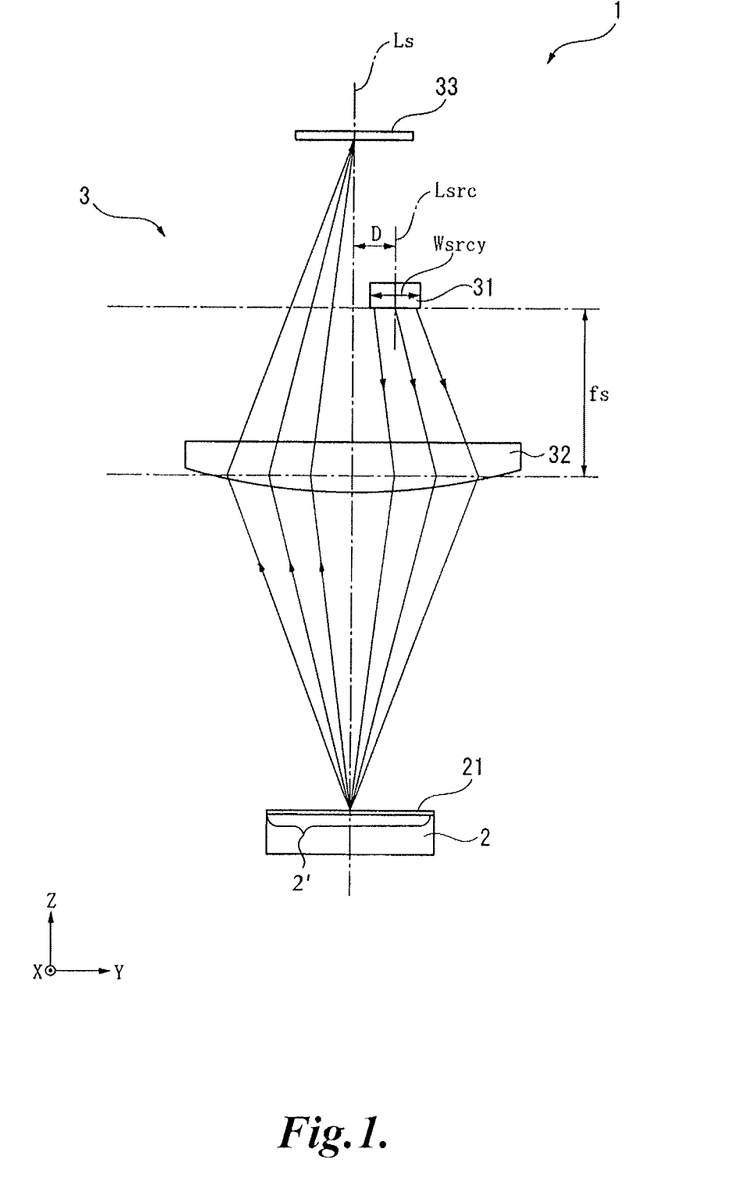
FIG. 1 is a schematic diagram illustrating an optical encoder according to the first embodiment of the present invention.

FIG. 1 is a schematic diagram illustrating an optical encoder 1 according to a first embodiment of the present invention. In FIG. 1, the X axis denotes an axis normal to a paper plane, the Y axis denotes an axis extending in a horizontal direction, and the Z axis denotes an axis extending in a vertical direction.

Figure 2:
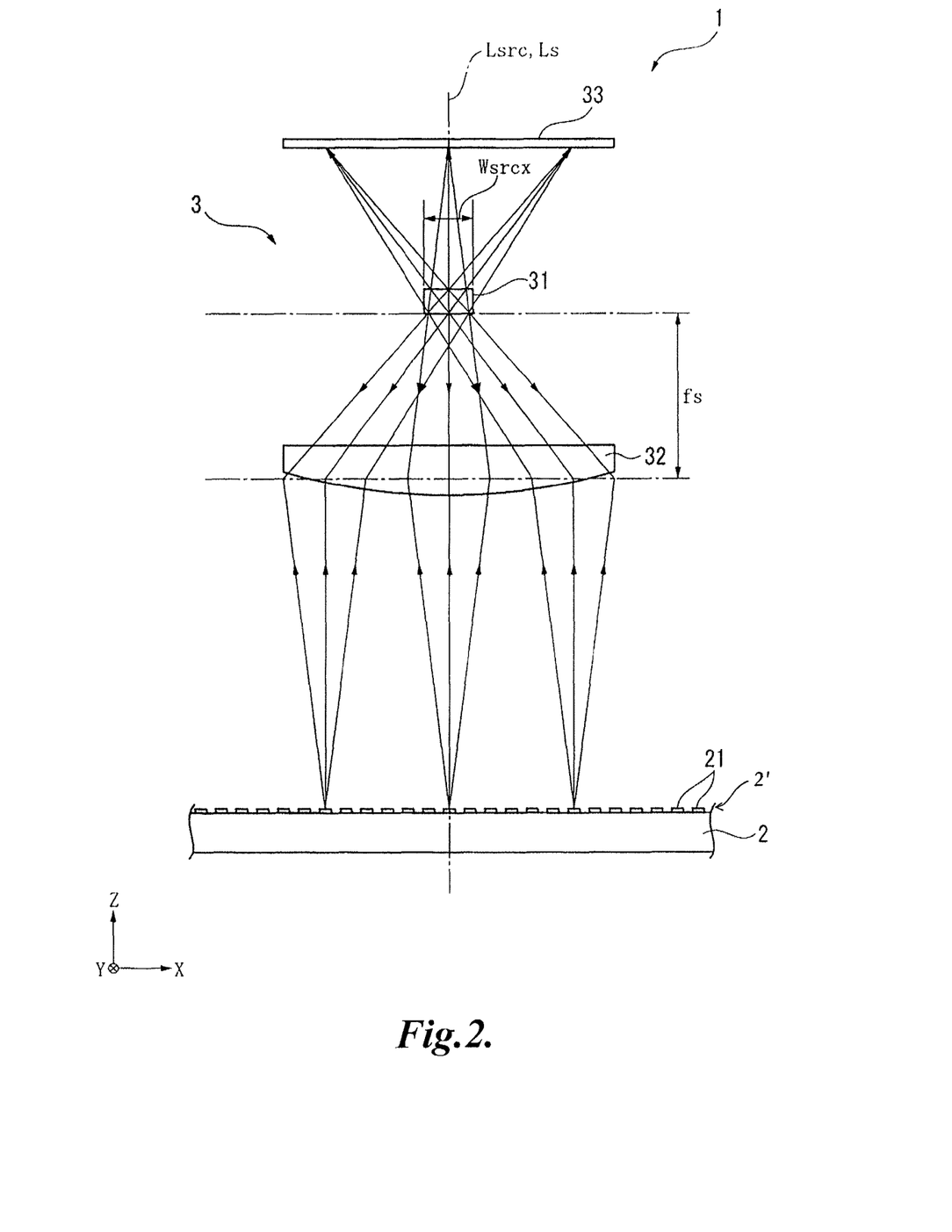
FIG. 2 is a schematic diagram illustrating the optical encoder according to a first embodiment of the present invention as seen in a direction perpendicular to scale markings.

Referring to FIGS. 1 and 2, the optical encoder 1 includes a scale 2 having latticed or striped scale markings 21 that can be read along the X-axis direction and a readhead 3 having a light source 31 which emits light to the scale 2, a scale-side lens 32 which transmits the light from the light source 31 to the scale 2, and a light receiving element 33 which is arranged in parallel with the scale 2 and receives the light that has been reflected by the scale 2 and has passed through the scale-side lens 32 so that the position of the readhead 3 with respect to the scale 2 is measured based on the light received by the light receiving element 33. That is, the scale-side lens 32 transmits the light reflected by the scale 2 to the light receiving element 33.

The scale 2 is formed to have a rectangular plate shape, of which the longitudinal direction is aligned along the X-axis direction, and the lateral direction is aligned along the Y-axis direction. FIG. 1 illustrates the optical encoder 1 as seen in the X-axis direction, that is, in a reading direction of the scale markings 21.

FIG. 2 is a schematic diagram illustrating the optical encoder 1 as seen in the Y-axis direction, that is, a direction perpendicular to the reading direction of the scale markings 21. In the present description, the direction (the Y-axis direction) perpendicular to a reading direction of the scale markings 21 may be referred to simply as the direction perpendicular to the scale markings 21. As shown in FIGS. 1 and 2, the light source 31 is arranged between the scale-side lens 32 and the light receiving element 33, and the distance between the light source 31 and the scale-side lens 32 is set to be the focal distance fs of the scale-side lens 32.

The optical axis Lsrc of the light source 31 is matched with the optical axis Ls of the scale-side lens 32 in the X reading direction of the scale markings 21 (refer to FIG. 2) and is separated from the optical axis Ls of the scale-side lens 32 by a predetermined distance D in the Y direction perpendicular to the scale markings 21 (refer to FIG. 1). Here, the predetermined distance D is set to be equal to or larger than ½ of the width Wsrcy (numerical aperture) of the light source 31 in the Y direction perpendicular to the scale markings 21.

Since the optical axis Lsrc of the light source 31 is separated from the optical axis Ls of the scale-side lens 32 by a predetermined distance D in the Y direction perpendicular to the scale markings 21, of the light emitted from the light source 31, the light on the light source 31 side in the Y direction perpendicular to the scale markings 21 is transmitted to the scale 2 through the light source 31 side of the scale-side lens 32 in the Y direction perpendicular to the scale markings 21 as shown in FIG. 1. This light is reflected by the scale 2 and received by the light receiving element 33 through the opposite side of the scale-side lens 32, opposite to the light source 31 side, in the Y direction perpendicular to the scale markings 21.

In FIGS. 1 and 2, the optical path of the light received by the light receiving element 33 is denoted by the solid line, and other optical paths of the light are omitted. In the following drawings, similar denotation will be used.

In addition, since the distance between the light source 31 and the scale-side lens 32 is set to be the focal distance fs of the scale-side lens 32, the optical encoder 1 can be used to constitute an object (the scale 2) side telecentric optical system in a reading direction of the scale markings 21 as shown in FIG. 2, so that it is possible to increase the focal depth.

Specifically, the numerical aperture NA of the scale-side lens 32 can be expressed as the following equation (1):

[Equation 1]

$$NA \approx Dp/(Dp-fs) \cdot Wsrcx/2Ds \qquad (1)$$

where Wsrcx denotes a width of the light source 31 in a reading direction of the scale markings 21, Ds (not shown) denotes a distance from the scale markings 21 of the scale 2 to the scale-side lens 32, and Dp (not shown) denotes a distance from the scale-side lens 32 to the light receiving element 33.

In addition, the focal depth DOF of the optical encoder 1 can be expressed as the following equation (2):

[Equation 2]

$$DOF = \lambda 2/NA^2 = 2\lambda Ds^2/Wsrcx^2 \cdot ((Dp-fs)/Dp)^2 \qquad (2)$$

where λ denotes a wavelength of the light emitted from the light source 31.

Therefore, it is possible to increase the focal depth DOF by reducing the width Wsrcx of the light source 31.

In the present embodiment, it is possible to obtain the following effects.

(1) In the optical encoder 1, since it is possible to separate the optical path of the light emitted from the light source 31 and directed toward the scale 2 and the optical path of the light reflected by the scale 2 and directed toward the light receiving element 33 through the scale-side lens 32 without a half-mirror, it is possible to obtain a sufficient light amount for the light receiving element 33.

(2) The scale 2 and the light receiving element 33 are arranged in parallel with each other, and a single scale-side lens 32 is arranged between the scale 2 and the light receiving element 33. In addition, the light source 31 is arranged between the scale-side lens 32 and the light receiving element 33. Therefore, it is possible to miniaturize the optical encoder 1.

(3) Since the optical encoder 1 can be used to constitute an object (the scale 2) side telecentric optical system in a reading direction of the scale markings 21, it is possible to increase the focal depth. Therefore, it is possible to increase the allowable interval between the scale 2 and the readhead 3.

(4) Since the predetermined distance D between the optical axis Lsrc of the light source 31 and the optical axis Ls of the scale-side lens 32 in the direction perpendicular to the scale markings 21 is set to be equal to or larger than ½ of the width Wsrcy of the light source 31 in the direction perpendicular to the scale markings 21, it is possible to improve use efficiency of the light emitted from the light source 31.

Second Embodiment

Hereinafter, a second embodiment of the present invention will be described with reference to the accompanying drawings. In the following descriptions, like reference numerals denote like elements as in the aforementioned embodiment, and descriptions thereof will not be repeated.

Figure 3:
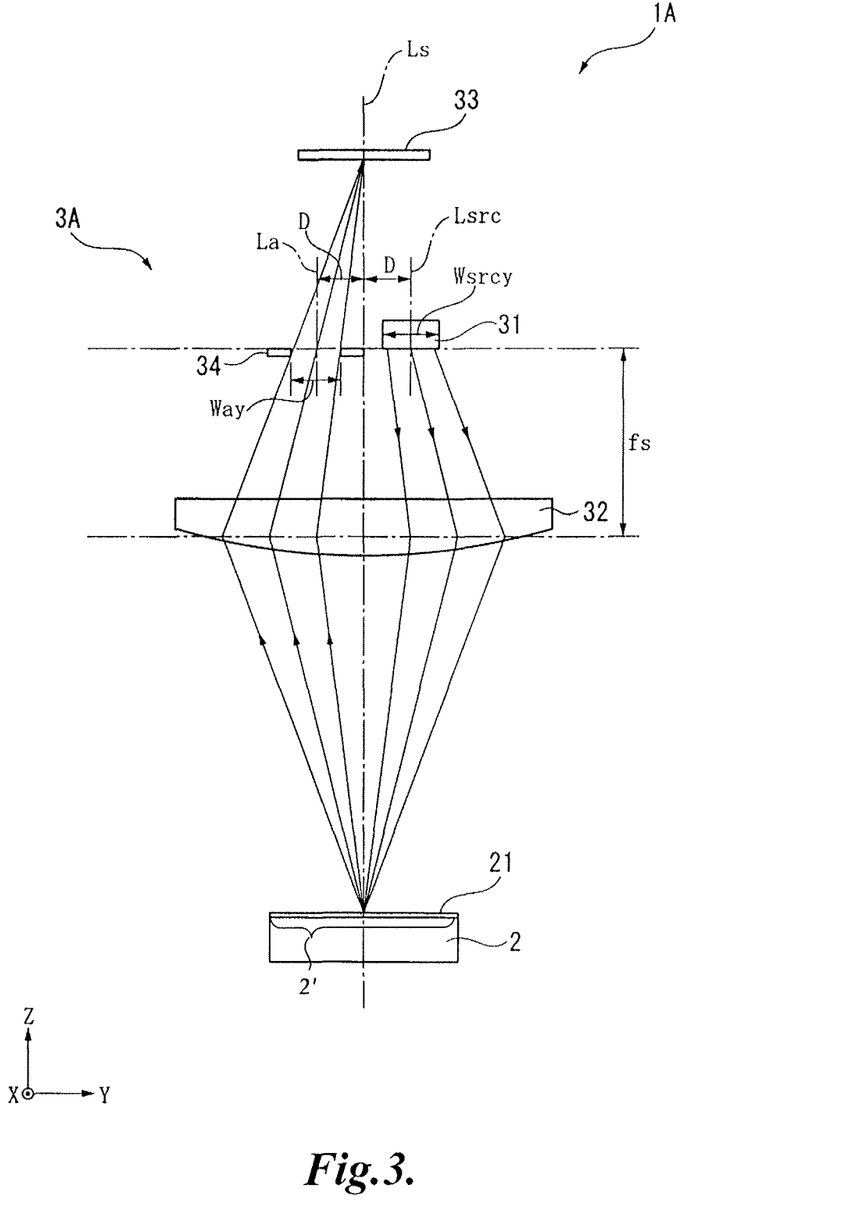
FIG. 3 is a schematic diagram illustrating the optical encoder according to a second embodiment of the present invention as seen in a reading direction of the scale markings.
Figure 4:
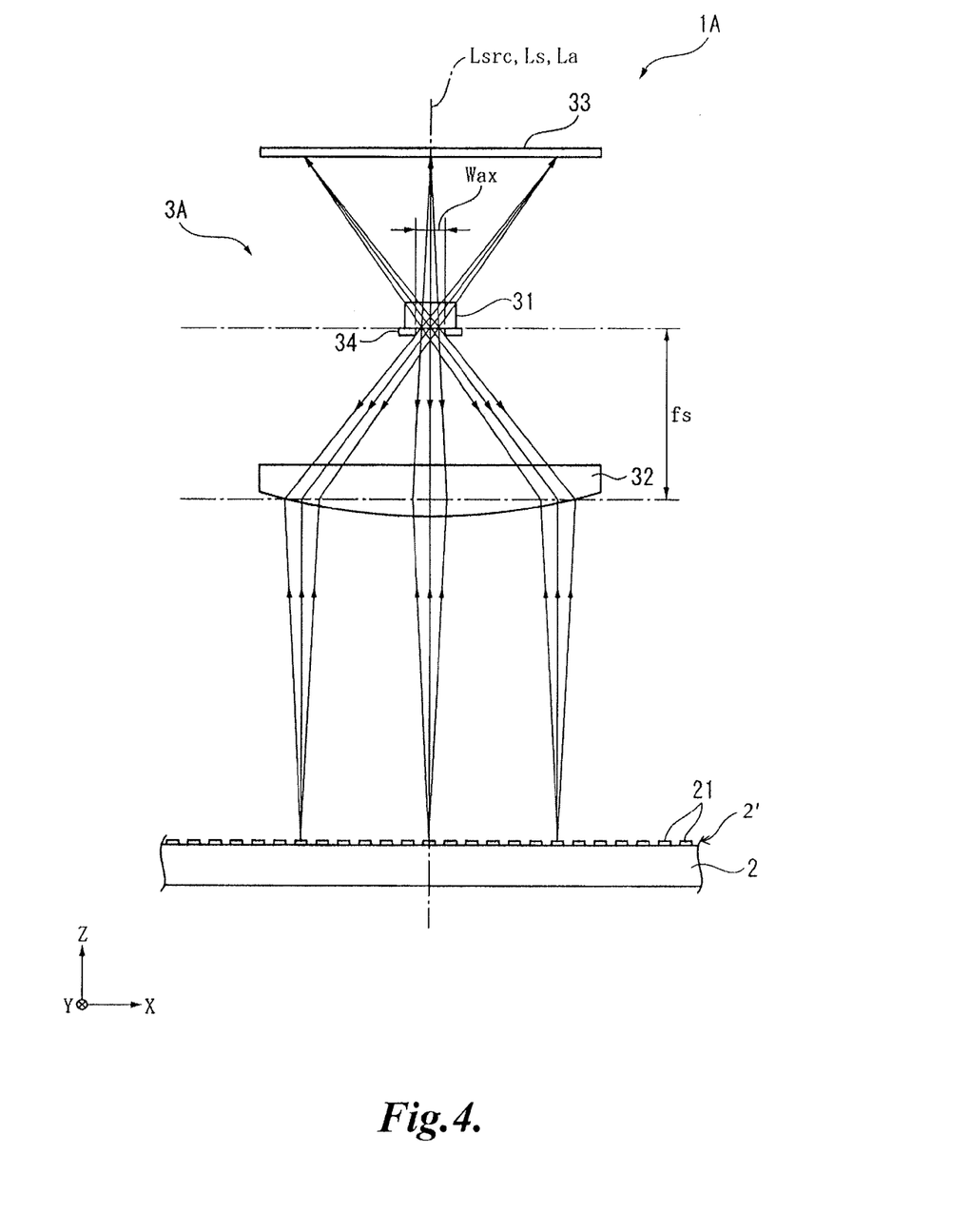
FIG. 4 is a schematic diagram illustrating the optical encoder according to the first and second embodiments as seen in a direction perpendicular to the scale markings.

FIG. 3 is a schematic diagram illustrating the optical encoder 1A as seen in a reading direction of the scale markings 21 (X direction) according to the second embodiment of the present invention. FIG. 4 is a schematic diagram illustrating the optical encoder 1A as seen in the Y direction perpendicular to the scale markings 21.

In the first embodiment, the optical encoder 1 includes the readhead 3 having the light source 31, the scale-side lens 32, and the light receiving element 33. On the other hand, in the present embodiment, the readhead 3A of the optical encoder 1A further includes an aperture 34 in addition to the light source 31, the scale-side lens 32, and the light receiving element 33 as shown in FIGS. 3 and 4.

The aperture 34 is provided to transmit the light that has been reflected by the scale 2 and has passed through the scale-side lens 32. The distance between the aperture 34 and the scale-side lens 32 is set to be the focal distance fs of the scale-side lens 32.

In addition, within the plane (i.e., the paper plane of FIG. 3) perpendicular to a reading direction of the scale markings 21, the optical axis La of the aperture 34 and the optical axis Lsrc of the light source 31 are axisymmetrical to each other with respect to the optical axis Ls of the scale-side lens 32. In other words, while the optical axis La of the aperture 34 is matched with the optical axis Ls of the scale-side lens 32 in the X reading direction of the scale markings 21 (refer to FIG. 4), the optical axis La of the aperture 34 is separated from the optical axis Ls of the scale-side lens 32 by a predetermined distance D in the Y direction perpendicular to the scale markings 21 (refer to FIG. 3).

Here, the width Way of the aperture 34 in the Y direction perpendicular to the scale markings 21 (refer to FIG. 3) is set to be a value as shown in the following equation (3) such that only a positioning error of the light source 31 of $\delta$ in the Y direction perpendicular to the scale markings 21 is allowable.

[Equation 3]

$$Way \leq Wsrcy - 2\delta \qquad (3)$$

In this setting, even when a positioning error of the light source 31 occurs in the Y direction perpendicular to the scale markings 21, it is possible to limit the light emitted from the light source 31 using the aperture 34 if the positioning error is equal to or smaller than $\delta$. Therefore, it is possible to suppress variance in the performance of the optical system of the optical encoder 1A due to a position deviation of the light source 31.

Since the distance between the aperture 34 and the scale-side lens 32 is set to be the focal distance fs of the scale-side lens 32, the optical encoder 1A can be used to constitute an object (the scale 2) side telecentric optical system in the X reading direction of the scale markings 21 as shown in FIG. 4. Therefore, it is possible to increase the focal depth.

Specifically, the numerical aperture NA of the scale-side lens 32 can be expressed as the following equation (4):

[Equation 4]

$$NA \cong Dp/(Dp-fs) \cdot Wax/2Ds \qquad (4)$$

where Wax denotes a width of the aperture 34 in the X reading direction of the scale markings 21, Ds (not shown) denotes a distance from the scale markings 21 of the scale 2 to the scale-side lens 32, and Dp (not shown) denotes a distance from the scale-side lens 32 to the light receiving element 33.

In addition, the focal depth DOF of the optical encoder 1A can be expressed as the following equation (5):

[Equation 5]

$$DOF = \lambda/2NA^2 = 2\lambda Ds^2/Wax^2 \cdot ((Dp-fs)/Dp)^2 \qquad (5)$$

where $\lambda$ denotes a wavelength of the light emitted from the light source 31.

Therefore, it is possible to increase the focal depth DOF by reducing the width Wax of the aperture 34.

According to the present embodiment, in addition to the aforementioned functions and effects of the first embodiment, it is possible to obtain the following functions and effects.

(5) Since the optical encoder 1A has the aperture 34 that transmits the light that has been reflected by the scale 2 and has passed through the scale-side lens 32, it is possible to provide an optical system by designing the width or position of the aperture 34, similarly to providing an optical system by designing the width or position of the light source 31.

(6) Since designing or positioning the aperture 34 is relatively easier than designing or positioning the light source 31, it becomes easier to suppress variance in the performance of the optical system of the optical encoder 1A.

Third Embodiment

Figure 5:
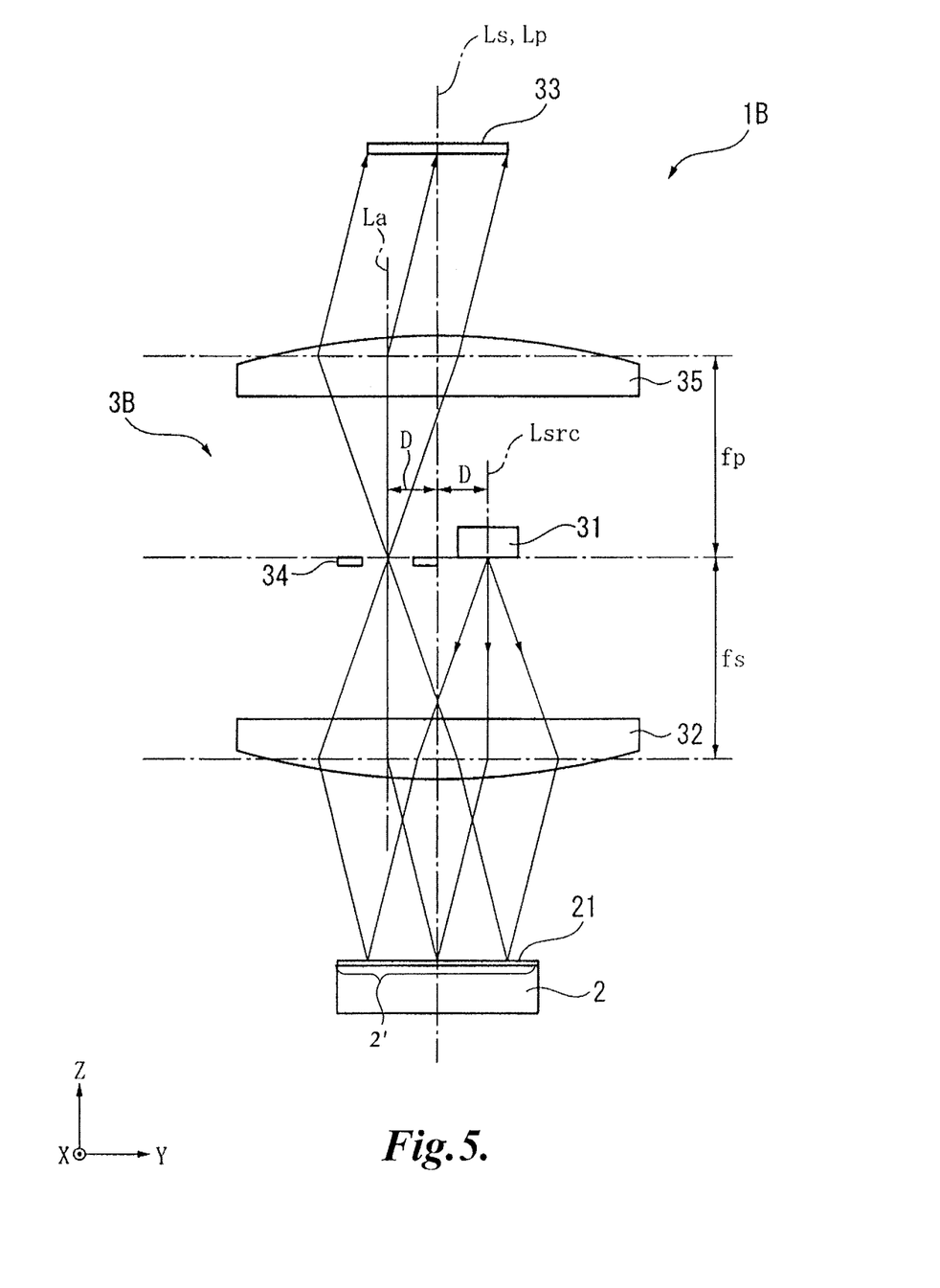
FIG. 5 is a schematic diagram illustrating the optical encoder according to a third embodiment of the present invention as seen in a reading direction of the scale markings.
Figure 6:
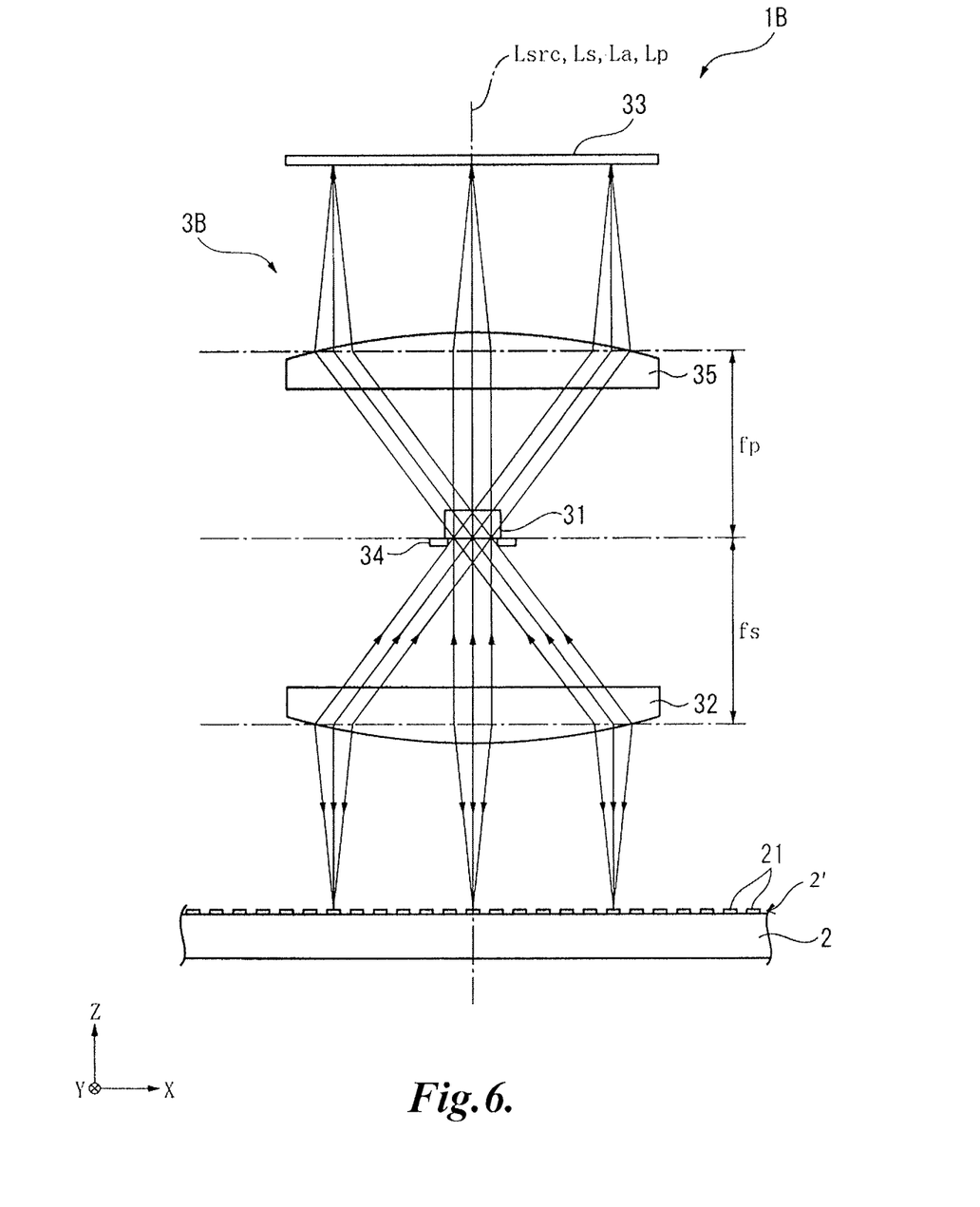
FIG. 6 is a schematic diagram illustrating the optical encoder according to the first to third embodiments as seen in a direction perpendicular to the scale markings.

FIG. 5 is a schematic diagram illustrating an optical encoder 1B as seen in the X reading direction of the scale markings 21 according to a third embodiment of the present invention. FIG. 6 is a schematic diagram illustrating the optical encoder 1B as seen in the Y direction perpendicular to the scale markings 21.

In the second embodiment, the optical encoder 1A includes the readhead 3A having the light source 31, the scale-side lens 32, the light receiving element 33, and the aperture 34. On the other hand, in the present embodiment, the optical encoder 1B includes the readhead 3B having a light receiving element-side lens 35 in addition to the light source 31, the scale-side lens 32, the light receiving element 33, and the aperture 34 as shown in FIGS. 5 and 6.

The light receiving element-side lens 35 is arranged between the aperture 34 and the light receiving element 33. The distance between the aperture 34 and the light receiving element-side lens 35 is set to be the focal distance fp of the light receiving element-side lens 35.

In addition, the optical axis Lp of the light receiving element-side lens 35 is matched with the optical axis Ls of the scale-side lens 32.

According to the present embodiment, in addition to the aforementioned functions and effects of the second embodiment, it is possible to obtain the following functions and effects.

(7) Since the optical encoder 1B can be used to constitute a bidirectional telecentric optical system in the X reading direction of the scale markings 21, it is possible to increase the focal depth. Accordingly, it is also possible to increase the allowable interval between the light receiving element 33 and the light receiving element-side lens 35.

Fourth Embodiment

Figure 7:
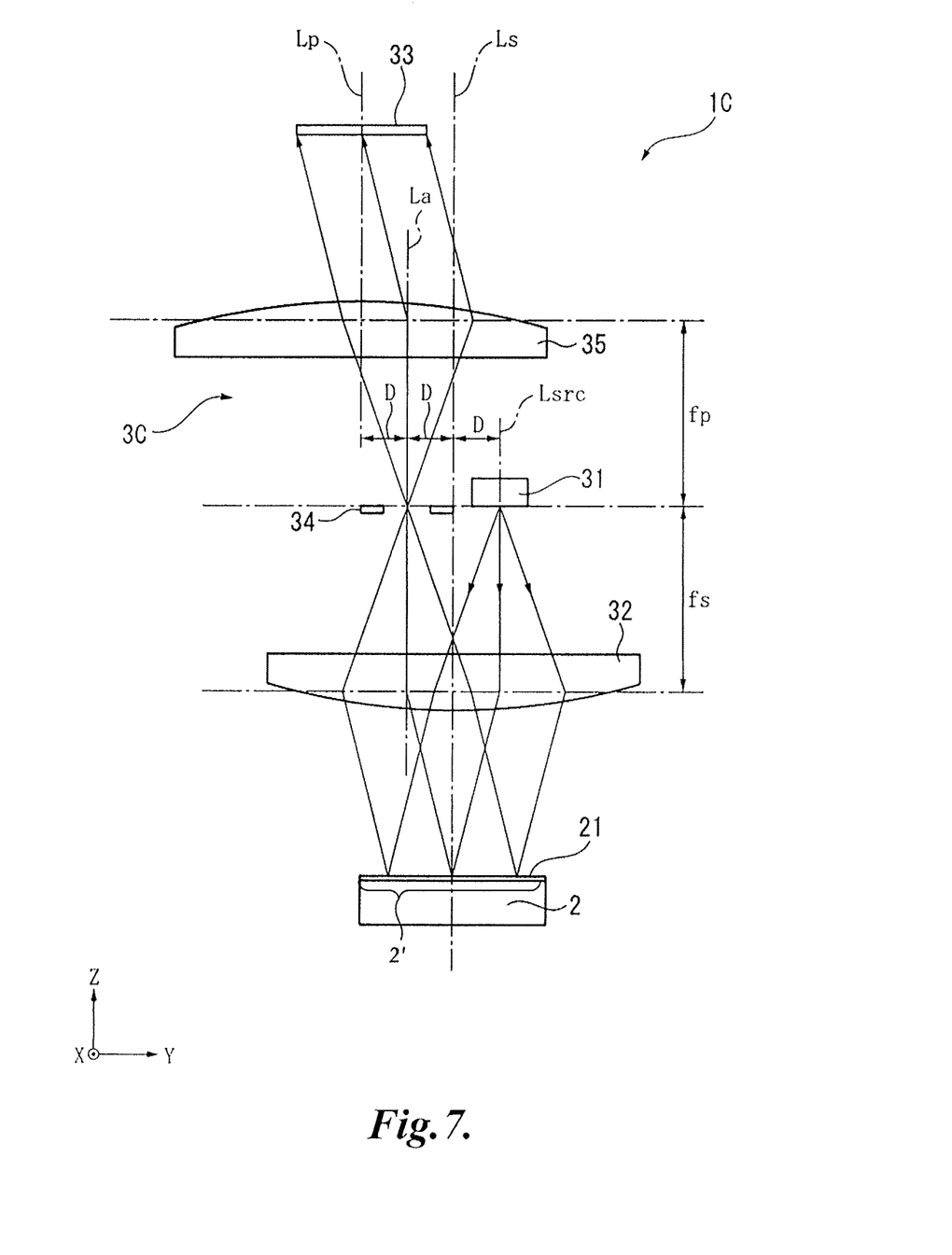
FIG. 7 is a schematic diagram illustrating the optical encoder according to a fourth embodiment of the present invention as seen in a reading direction of the scale markings.

FIG. 7 is a schematic diagram illustrating the optical encoder 1C according to a fourth embodiment of the present invention as seen in the X reading direction of the scale markings 21.

In the third embodiment, the optical encoder 1B includes the readhead 3B, and the optical axis Lp of the light receiving element-side lens 35 of the readhead 3B is matched with the optical axis Ls of the scale-side lens 32. On the other hand, according to the present embodiment, as shown in FIG. 7, the optical encoder 1C includes a readhead 3C, and the optical axis Lp of the light receiving element-side lens 35 of the readhead 3C is matched with the optical axis Ls of the scale-side lens 32 in the X reading direction of the scale markings 21, while Lp is separated from the optical axis Ls of the scale-side lens 32 by twice the predetermined distance D in the Y direction perpendicular to the scale markings 21.

According to the present embodiment, in addition to the aforementioned functions and effects of the third embodiment, it is possible to obtain the following functions and effects.

(8) In the Y direction perpendicular to the scale markings 21, both the optical axes Ls and Lp of the scale-side lens 32 and the light receiving element-side lens 35 are separated from the optical axis La of the aperture 34 by a predetermined distance D on both sides. Therefore, the light passing through the aperture 34 transmits through the portions of the scale-side lens 32 and the light receiving element-side lens 35 having the same shape. As a result, the optical encoder 1C can be used to reduce influence of the lens aberration and perform accurate measurement.

Fifth Embodiment

Figure 8:
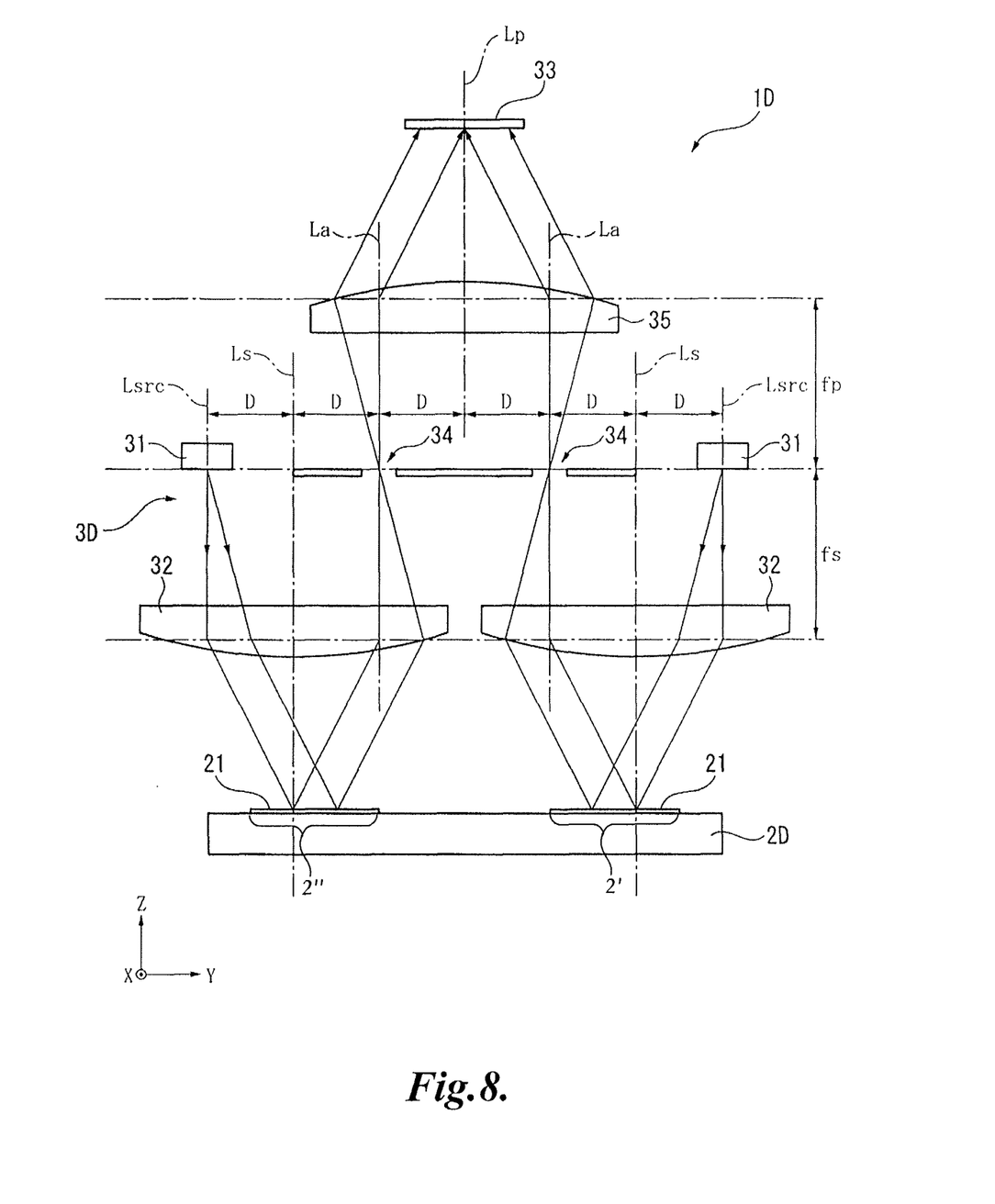
FIG. 8 is a schematic diagram illustrating the optical encoder according to a fifth embodiment of the present invention as seen in a reading direction of the scale markings.

FIG. 8 is a schematic diagram illustrating the optical encoder 1D according to a fifth embodiment of the present invention as seen in the X reading direction of the scale markings 21.

In the fourth embodiment of FIG. 7, the optical encoder 1C includes the readhead 3C, and the readhead 3C has a single light source 31, a single scale-side lens 32, and a single aperture 34. On the other hand, according to the present embodiment, as shown in FIG. 8, the optical encoder 1D includes a readhead 3D, and the readhead 3D has two light sources 31, two scale-side lenses 32, and two apertures 34. In addition, two apertures 34 are formed in a single member.

In the fourth embodiment of FIG. 7, the optical encoder 1C includes the scale 2 having latticed or striped scale markings 21. On the other hand, according to the present embodiment, the scale 2D includes two sets of latticed or striped scale markings 21.

Furthermore, according to the present invention, within a plane (paper plane of FIG. 8) perpendicular to the X reading direction of the two sets of scale markings 21, the optical axes Lsrc, Ls, and La of the light sources 31, the scale-side lenses 32, and the apertures 34 are axisymmetrical to one another with respect to the optical axis Lp of the light receiving element-side lens 35.

According to the present embodiment, in addition to the aforementioned functions and effects of the fourth embodiment, it is possible to obtain the following functions and effects.

(9) In the optical encoder 1D, since the light beams reflected by two sets of scale markings 21 can be received by a single light receiving element 33, it is possible to reduce the number of components in comparison with the case where the optical encoder is configured to receive the light beams with two light receiving elements.

Sixth Embodiment

Figure 9:
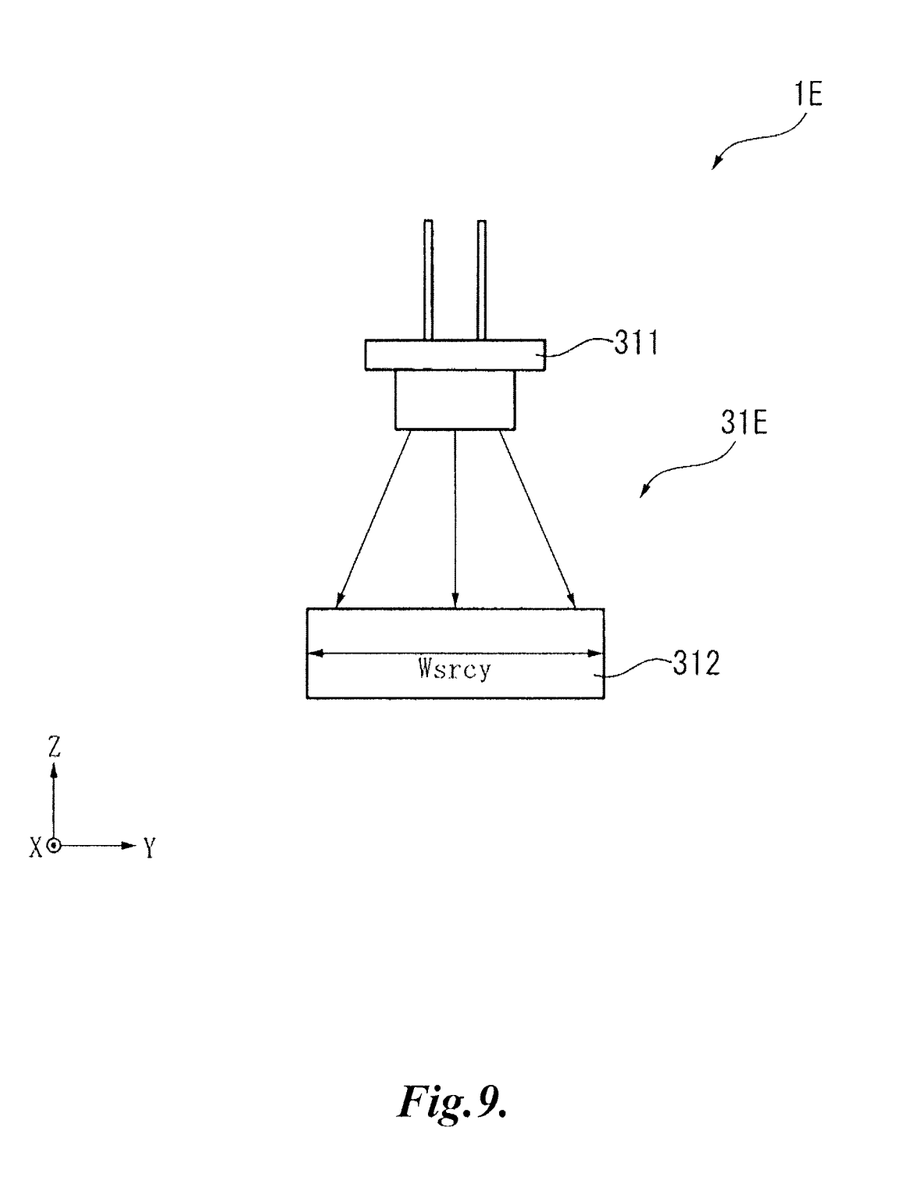
FIG. 9 is a schematic diagram illustrating a light source of the optical encoder according to a sixth embodiment of the present invention.

FIG. 9 is a schematic diagram illustrating the light source 31E of the optical encoder 1E according to a sixth embodiment of the present invention.

In the aforementioned embodiments, each of the optical encoders 1 to 1D includes the light source 31. On the other hand, according to the present embodiment, the optical encoder 1E includes a light source 31E, and the light source 31E includes a light-emitting body 311 that emits light and a diffusion plate 312 that is arranged in a later stage of the optical path of the emitted light from the light-emitting body 311 and diffuses the light emitted from the light-emitting body 311 as shown in FIG. 9.

Although not shown in the drawings, a distance between a plane of the diffusion plate 312 on the scale-side lens 32 side (on the lower side of FIG. 9) and the scale-side lens 32 is set to be the focal distance fs of the scale-side lens 32.

According to the present embodiment, in addition to the aforementioned functions and effects, it is possible to obtain the following functions and effects.

(10) Since the width of the light source 31E can be substituted with the width of the diffusion plate 312, it is possible to easily design the optical encoder 1E.

Seventh Embodiment

Figure 10:
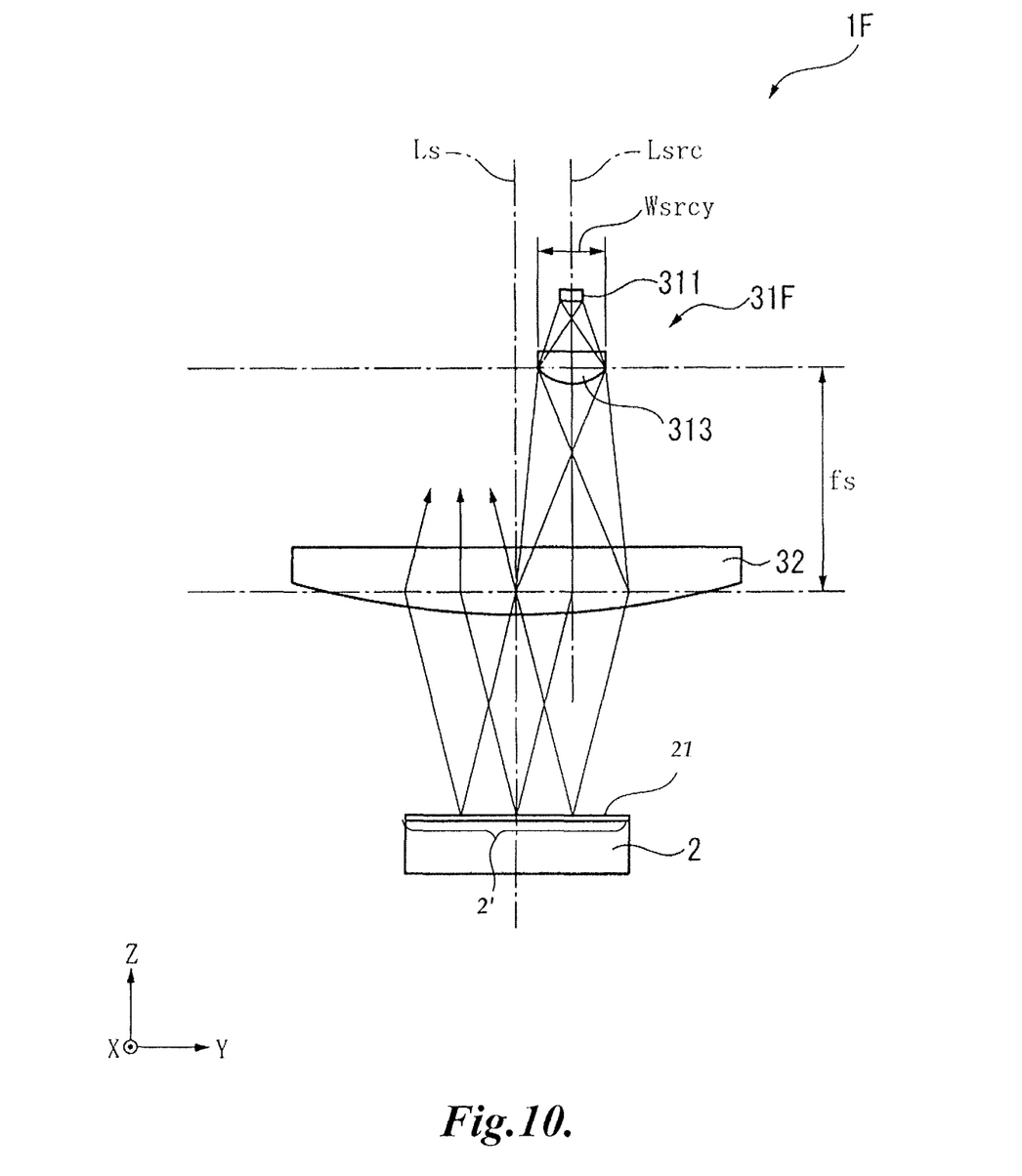
FIG. 10 is a schematic diagram illustrating a light source of the optical encoder according to a seventh embodiment of the present invention.

FIG. 10 is a schematic diagram illustrating a light source 31F of an optical encoder 1F according to a seventh embodiment of the present invention.

In the first to fifth embodiments, the optical encoder 1 to 1D includes the light source 31. On the other hand, according to the present embodiment, the optical encoder 1F includes the light source 31F as shown in FIG. 10, and the light source 31F includes a light-emitting body 311 that emits light and a light-emitting body lens 313 arranged in a later stage of the optical path of the light emitting from the light-emitting body 311 such that the scale-side lens 32 and the light-emitting body lens 313 constitute a Kohler illumination.

According to the present embodiment, in addition to the aforementioned functions and effects, it is possible to obtain the following functions and effects.

(11) Since it is possible to reduce unevenness of the light emitted from the light source 31F and directed toward the scale 2 through the scale-side lens 32, it is possible to perform accurate measurement.

Modification of the Embodiments

The present invention is not limited to the aforementioned embodiments but may include various modifications and variations within the scope of the invention.

For example, while, in each of the aforementioned embodiments, the predetermined distance D is set to be equal to or larger than ½ of the width Wsrcy of the light source 31, 31E, or 31F in the Y direction perpendicular to the scale markings 21, it may be set to other values.

The invention claimed is:

1. An optical encoder comprising a scale, which has scale markings, and a readhead, which has a light source that emits light to the scale and a light receiving element that is arranged in parallel with the scale to receive the light reflected by the scale, so that a position of the readhead with respect to the scale is measured based on the light received by the light receiving element, wherein the readhead has a scale-side lens that transmits the light emitted from the light source to the scale and transmits the light reflected by the scale to the light receiving element, wherein the light source is arranged between the scale-side lens and the light receiving element, and wherein an optical axis of the light source is matched with an optical axis of the scale-side lens in a reading direction of the scale markings and is separated from an optical axis of the scale-side lens by a predetermined distance in a direction perpendicular to a reading direction of the scale markings.

2. The optical encoder according to claim 1, wherein the predetermined distance is set to be equal to or larger than ½ of a width of the light source in a direction perpendicular to a reading direction of the scale markings.

3. The optical encoder according to claim 2, wherein the readhead has an aperture for transmitting the light that has been reflected by the scale and has passed through the scale-side lens.

4. The optical encoder according to claim 3, wherein within a plane perpendicular to a reading direction of the scale markings, an optical axis of the aperture and an optical axis of the light source are axisymmetrical to each other with respect to an optical axis of the scale-side lens.

5. The optical encoder of claim 3, wherein a distance between the aperture and the scale-side lens is set to be a focal distance of the scale-side lens.

6. The optical encoder according to claim 3, wherein the readhead has a light receiving element-side lens arranged between the aperture and the light receiving element.

7. The optical encoder according to claim 6, wherein a distance between the aperture and the light receiving element-side lens is set to be a focal distance of the light receiving element-side lens.

8. The optical encoder according to claim 6, wherein an optical axis of the light receiving element-side lens is matched with an optical axis of the scale-side lens in a reading direction of the scale markings.

9. The optical encoder according to claim 8, wherein the optical axis of the light receiving element-side lens is separated from the optical axis of the scale-side lens in a direction perpendicular to a reading direction of the scale markings.

10. The optical encoder according to claim 9, wherein the optical axis of the light receiving element-side lens is separated from the optical axis of the scale-side lens by twice the predetermined distance in a direction perpendicular to a reading direction of the scale markings.

11. The optical encoder according to claim 6,
wherein the readhead has two light sources, two scale-side lenses, and two apertures, and
within a plane perpendicular to a reading direction of the scale markings, the optical axes of the two light sources, the two scale-side lenses, and the two apertures, respectively, are axisymmetrical to one another with respect to an optical axis of the light receiving element-side lens.

12. The optical encoder according to claim 6,
wherein the readhead has a first set of a light source, a scale-side lens, and an aperture, and a second set of a light source, a scale-side lens, and an aperture, and
within a plane perpendicular to a reading direction of the scale markings, the second set is offset from the first set in a direction perpendicular to a reading direction of the scale markings.

13. The optical encoder according to claim 1, wherein the light source includes a light-emitting body that emits light and a diffusion plate that is arranged in a later stage of an optical path of the light emitted from the light-emitting body and diffuses the light emitted from the light-emitting body.

14. The optical encoder according to claim 1, wherein the light source includes a light-emitting body that emits light and a light-emitting body lens arranged in a later stage of an optical path of the light emitted from the light-emitting body, and
the scale-side lens and the light-emitting body lens constitute a Kohler illumination.

15. The optical encoder according to claim 1, wherein a distance between the light source and the scale-side lens is set to be a focal distance of the scale-side lens.

* * * * *